US009540045B2

(12) United States Patent
Becker et al.

(10) Patent No.: US 9,540,045 B2
(45) Date of Patent: Jan. 10, 2017

(54) METHOD FOR ASSISTING A DRIVER OF A MOTOR VEHICLE

(75) Inventors: Markus Becker, Tamm (DE); Jochen Staack, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 66 days.

(21) Appl. No.: 13/575,024

(22) PCT Filed: Jan. 17, 2011

(86) PCT No.: PCT/EP2011/050501
§ 371 (c)(1),
(2), (4) Date: Oct. 19, 2012

(87) PCT Pub. No.: WO2011/092063
PCT Pub. Date: Aug. 4, 2011

(65) Prior Publication Data
US 2013/0046431 A1 Feb. 21, 2013

(30) Foreign Application Priority Data
Jan. 29, 2010 (DE) .................... 10 2010 001 368

(51) Int. Cl.
B62D 15/02 (2006.01)
(52) U.S. Cl.
CPC ......... B62D 15/028 (2013.01); B62D 15/0285 (2013.01)
(58) Field of Classification Search
CPC .. B62D 15/028; B62D 15/0285; B62D 15/027
USPC ....................................................... 701/23
See application file for complete search history.

(56) References Cited

U.S. PATENT DOCUMENTS

| 2002/0041239 A1* | 4/2002 | Shimizu et al. ............ 340/932.2 |
| 2004/0254720 A1* | 12/2004 | Tanaka et al. ................ 701/200 |
| 2005/0264099 A1 | 12/2005 | Kamiya et al. |
| 2010/0271236 A1* | 10/2010 | Moshchuk et al. ........ 340/932.2 |

FOREIGN PATENT DOCUMENTS

| CN | 1737499 | 2/2006 |
| DE | 10 2005 017 359 | 11/2005 |
| DE | 10 2004 054 437 | 5/2006 |
| DE | 10 2006 048 910 | 4/2008 |
| EP | 1 626 384 | 2/2006 |
| EP | 1 864 889 | 12/2007 |

(Continued)

OTHER PUBLICATIONS

International Search Report for PCT/EP2011/050501, dated Apr. 27, 2011.

*Primary Examiner* — Basil T Jos
(74) *Attorney, Agent, or Firm* — Norton Rose Fulbright US LLP

(57) ABSTRACT

In a method for assisting a driver of a motor vehicle during a driving maneuver, the surroundings of the motor vehicle are initially detected, at least one suitable trajectory for carrying out the driving maneuver is computed based on the detected surroundings, and the motor vehicle is automatically steered in order to carry out the driving maneuver. If there is a malfunction, the driver is informed, the automatic steering operation is terminated, and the driver receives information on the basis of which the driver may continue the driving maneuver.

9 Claims, 1 Drawing Sheet

(56) References Cited

FOREIGN PATENT DOCUMENTS

| | | |
|---|---|---|
| EP | 1 867 557 | 12/2007 |
| EP | 2 050 640 | 4/2009 |
| JP | 2005-75015 | 3/2005 |
| JP | 2007-532394 | 11/2007 |
| JP | 2010-18167 | 1/2010 |

* cited by examiner

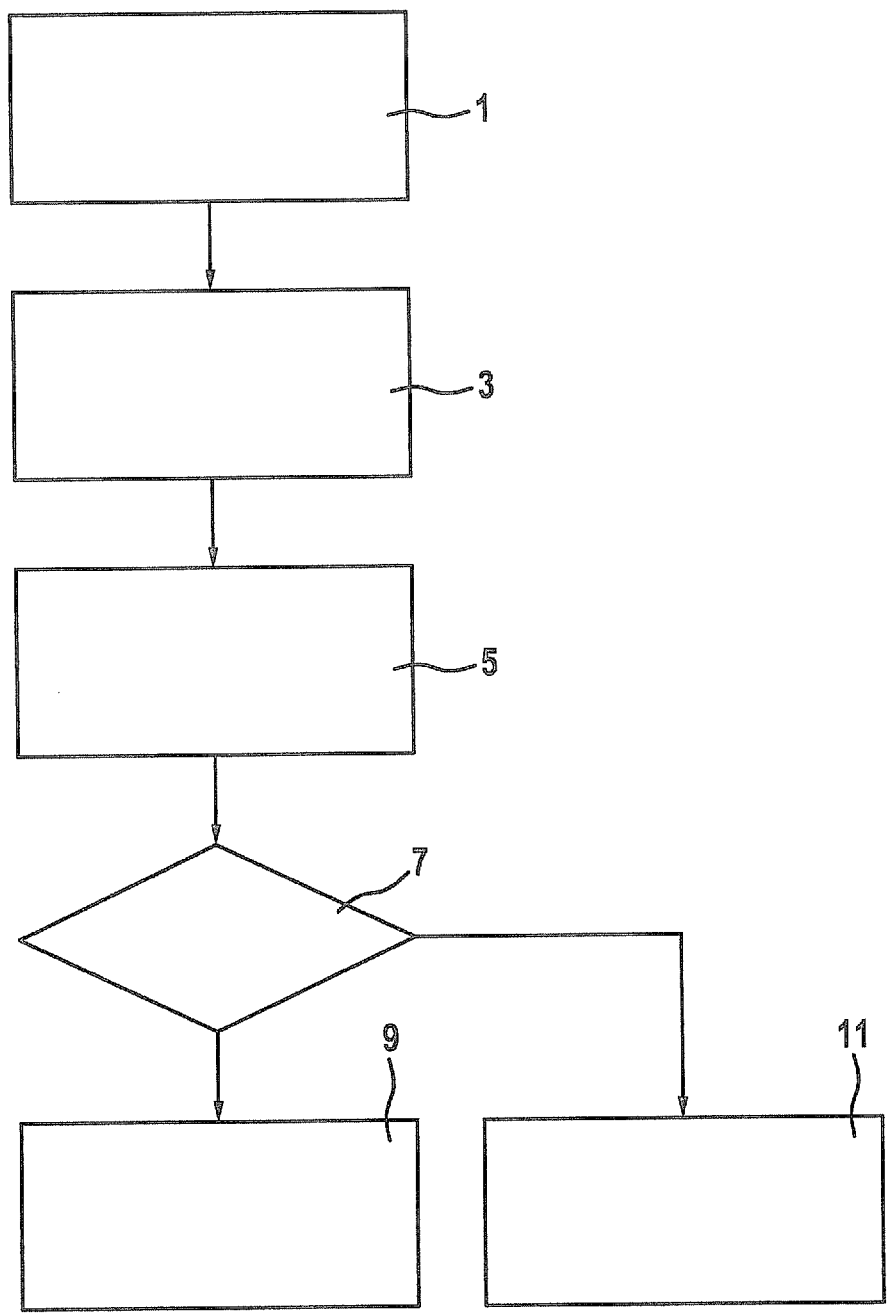

METHOD FOR ASSISTING A DRIVER OF A MOTOR VEHICLE

BACKGROUND OF THE INVENTION

1. Field of the Invention

The present invention relates to a method for assisting a driver of a motor vehicle during a driving maneuver.

2. Description of the Related Art

Methods for assisting a driver of a motor vehicle include in particular methods which assist the driver during complex maneuvers, for example while parking in a parking space. Parking in a parking space may occur either in the forward or the backward direction. Assistance is usually provided for backing-up parking operations.

For systems which assist the driver during driving maneuvers, a distinction is made between systems which indicate to the driver only the distance from objects in the surroundings of the vehicle, the indication generally being provided visually and/or acoustically, and systems which either indicate necessary interventions to the driver or which automatically take over the steering. Longitudinal guidance may also be taken over.

Also for systems in which the steering and optionally also the longitudinal guidance are taken over by the assistance system, it is advantageous to indicate to the driver distances from objects in the surroundings of the vehicle. The indication is usually provided acoustically by repetitive signal tones, the pause between two tones decreasing as the distance from an object decreases. If the distance is less than a predefined minimum distance, a continuous tone sounds which prompts the driver to stop the vehicle. Alternatively or additionally, an visual display, for example with the aid of LEDs, may be provided. Usually, the number of LEDs that light up increases as the distance decreases. It is also possible to use differently colored LEDs if the distance is less than a predefined distance. In addition to the display by LEDs, a two-dimensional top-view representation on a display unit of an onboard computer, for example a monitor, is also possible.

In order to carry out an automatic steering intervention only when all systems of the driver assistance system are ready, as known from published German patent application document 10 2005 017 359, a check is initially made as to whether the control unit of the parking assistance system is not reporting errors, the control unit of the steering actuator is not reporting errors, and the communication between the two control units has no errors. No automatic steering intervention is carried out if all of the conditions are not met. However, this has the disadvantage that if there is a malfunction in a device, the assistance to the driver ceases completely. Thus, no more assistance is provided to the driver during a driving maneuver.

BRIEF SUMMARY OF THE INVENTION

In a method according to the present invention for assisting a driver of a motor vehicle during a driving maneuver, the surroundings of the motor vehicle are initially detected, and at least one suitable trajectory for carrying out the driving maneuver is computed based on the fixed detected surroundings, and the motor vehicle is steered automatically to carry out the driving maneuver. If there is a malfunction, the driver is informed, the automatic steering operation is terminated, and the driver receives information on the basis of which he may continue the driving maneuver.

As the result of informing the driver that a malfunction has occurred, and outputting information for carrying out the further driving maneuver, there is no complete abort when a malfunction is detected. This also allows the driver to continue to resort to assistance during the driving maneuver to be carried out. It is particularly advantageous when only the portion of the driver assistance system that causes a malfunction is deactivated.

To be able to compute a suitable trajectory for carrying out the driving maneuver, it is necessary to detect the surroundings of the motor vehicle. The surroundings of the motor vehicle are generally detected by using suitable distance sensors. Examples of suitable distance sensors are ultrasonic sensors, infrared sensors, radar sensors, LIDAR sensors, or capacitive sensors. In addition to the above-mentioned sensors, the surroundings may be detected using video-based sensors, for example a camera having a suitable image processing system. If the driving maneuver is a parking operation, generally a distance sensor mounted on the side of the vehicle measures the distance from objects next to the vehicle as the vehicle passes by. Based on the ascertained signal pattern, it is recognized whether, and at what location, a suitable parking space is present. Since the parking space is detected while the vehicle is passing by, and the vehicle generally passes by in the forward direction, the first driving motion into the parking space is generally a backwards motion. Based on the data of the surroundings which are detected in this way, a trajectory along which the driving maneuver is carried out may be computed with the aid of a suitable control unit. If parking in one motion sequence is not possible during a parking operation, it is also possible for multiple trajectories, along which the vehicle may be parked in the parking space, to be directly computed. This is necessary, for example, in confined surroundings or for a short parking space. However, it is preferred when parking may be carried out in a single motion sequence.

To carry out the driving maneuver, in a first specific embodiment the automatic steering operation includes automatic steering of the motor vehicle. In this case, the steering intervention is taken over by the driver assistance system, and the driver only has to take over the longitudinal guidance. This means that the driver only has to depress the gas pedal and the brake of the motor vehicle in order to appropriately accelerate or brake the vehicle or maintain the speed of the vehicle. To assist the driver in carrying out the longitudinal guidance, it is also advantageous to continuously detect distances from objects in the surroundings of the vehicle during the driving maneuver, and to display the distances to the driver. The driver is thus able to bring the vehicle to a stop at the right time. Even if it is necessary to brake the vehicle at the end of a trajectory to be driven through for the driving maneuver, in particular if a driving maneuver involving multiple motion sequences is carried out, the driver is likewise provided with information for longitudinal guidance, in particular for stopping the vehicle.

In another specific embodiment, in addition to the automatic steering the automatic steering operation includes automatic longitudinal guidance of the motor vehicle. The automatic longitudinal guidance may mean, for example, fully automatic longitudinal guidance; i.e., the entire longitudinal guidance is taken over by the driver assistance system. In this case, the driver is merely assigned a monitoring task. The vehicle accelerates automatically, maintains its speed, and also brakes automatically. In one alternative specific embodiment, the automatic longitudinal guidance includes only automatic braking. To carry out the longitudinal guidance, it is necessary in this case, for example, for the driver to depress the gas pedal in order to maintain the particular necessary speed of the vehicle. An automatic braking operation is carried out in each case when an end point of a trajectory is reached. For continuous detection of the surroundings, an automatic braking operation is likewise carried out if the vehicle approaches an object up to a predefined minimum distance. To avoid a collision, for example when a moving object such as a pedestrian or a cyclist appears, it is also advantageous if the driver is able to override the automatic driver assistance system. Thus, for example, the vehicle is always stopped when the driver activates the brake of the vehicle. The automatic steering may be taken over after the brake is released. To allow an automatic steering intervention, a suitable servomotor is provided, for example, with the aid of which the steerable wheels and optionally also the steering wheel of the vehicle may be moved. Alternatively, separate servomotors may be provided for the steerable wheels and for the steering wheel. The servomotors are controlled via a suitable control unit which is controlled by the driver assistance system or which is included in the driver assistance system. To allow automatic longitudinal guidance, it is possible, for example, to transmit a braking intervention via braking instructions from the control unit of the driver assistance system to an ESP system. This may be carried out via a CAN network, for example. Similarly, instructions for accelerating the vehicle or for maintaining the speed may also be transmitted to the ESP system or another suitable control system for accelerating the vehicle.

According to the present invention, the driver of the motor vehicle is informed if there is a malfunction. The malfunction may include, for example, malfunctions of the steering system or of the brake system of the motor vehicle. An example of such a malfunction is the failure of a servomotor for the automatic steering, or malfunctions in data transmission, for example to the control unit for the servomotors for the automatic steering, or also to the ESP system of the vehicle. To identify such a malfunction it is possible, for example, for the control unit of the driver assistance system to wait in each case for a response from the ESP system or the control system of the servomotors for the steering. A malfunction is deduced if there is no response or if the response is incorrect.

The driver of the motor vehicle is informed as soon as such a malfunction is identified. In addition, the automatic steering operation is terminated. The termination of the automatic steering operation may be indicated to the driver by visual and/or acoustic and/or haptic means, for example. The information concerning a malfunction and the indication of the termination of the automatic steering operation may take place simultaneously over the same system, or via separate indications. Thus, for example, it is possible for the driver to be notified of a malfunction via a visual display, for example a notification on a display device of the onboard computer, and at the same for the driver to be haptically notified of the automatic termination of the steering operation. A haptic indication is provided, for example, by having the steering wheel vibrate; however, since the driver is not touching the steering wheel during an automatically steered driving maneuver, a haptic notification may also be provided by having the driver's seat vibrate. The driver's attention is thus gained, and the driver is notified that there is a malfunction. For a visual display it is possible, for example, to indicate on a display of the onboard computer the trajectory to be traveled on, and to also superimpose the trajectory actually traveled. As soon as there is a difference between the computed trajectory and the actual trajectory, the driver is able to see that there are problems with the automatic steering operation of the vehicle. To direct the driver's attention to the display, a warning tone, any other given warning signal, or also voice output which notifies the driver of the malfunction may occur at the same time.

To provide the driver with further assistance during the driving maneuver when there is a malfunction, it is preferred if, after the automatic steering operation is terminated, the driver is provided with necessary information concerning, for example, the required steering motions for traveling on the computed trajectory. In this case, the driver may be guided by the information in order to travel on the computed trajectory and to complete the driving maneuver. If errors occur, also during the display of the required steering motions, which are noted by the driver assistance system, it is also advantageous not to provide the driver with further information concerning required steering motions, but to continue to inform the driver of distances from objects in the surroundings of the motor vehicle.

In general, however, it is possible to provide the driver with necessary steering information for traveling on the computed trajectory, so that the necessary steering information may continue to be provided if the automatic steering fails.

If the steering system still functions but problems arise on the brake system, so that the driver must take over the longitudinal guidance, it is particularly advantageous if, in this case as well, the automatic steering interventions are terminated and the driver must also take over the steering of the vehicle. The driver of the motor vehicle thus receives a clear indication that the driver assistance system to which he is accustomed is not available. As the result of taking over the steering, the driver is also reminded that the vehicle is not automatically braked. It is thus made clear to the driver that he is solely responsible for steering interventions and longitudinal guidance of the vehicle, even if the driver continues to be provided with the necessary information for steering the vehicle.

The driving maneuver in which the driver is assisted is in particular a parking maneuver into a perpendicular parking space or into a parallel parking space. However, the driving maneuver may also be, for example, a driving maneuver in narrow roadways, parking garages, or parking lots. Usually, however, the driving maneuver is a parking maneuver into a perpendicular parking space or into a parallel parking space. To allow computation of the at least one suitable trajectory for carrying out the driving maneuver, for detecting the surroundings of the motor vehicle it is advantageous to detect the distance from objects in the surroundings of the motor vehicle, and to create a surroundings map based on the detected distances from objects in the surroundings of the motor vehicle. In particular, it is preferred if the surroundings map, which has been created based on the detected distances from objects, together with the position of the motor vehicle are displayed to the driver. In this way, the driver of the motor vehicle receives additional information concerning the planned driving maneuver, and is thus better able to monitor the driving maneuver. In particular, in this way it may be easily displayed to the driver of the motor vehicle when there are differences between the planned driving maneuver and the driving maneuver actually carried out, which indicate malfunctions, for example. Specific information concerning a malfunction may also be provided in this way.

To allow the planned driving maneuver to be represented to the driver, it is also preferred if the at least one trajectory for carrying out the driving maneuver is displayed in the surroundings map. By displaying the trajectory in the surroundings map, sudden driving moves are avoided, since the driver is able to follow the planned driving maneuver. In addition, necessary steering interventions may be easily indicated if a malfunction occurs and the driver himself must take over the steering.

To allow the driving maneuver to be followed, or to check as to whether the surroundings map ascertained by the system matches the actual surroundings, it is also advantageous if the position of the motor vehicle on the trajectory is displayed to the driver. As the result of displaying the motor vehicle on the trajectory, differences between the computed trajectory and the route actually traveled are also displayed at the same time to the driver. This also allows a display of malfunctions.

BRIEF DESCRIPTION OF THE DRAWING

The FIGURE shows a flow chart of the method according to the present invention.

DETAILED DESCRIPTION OF THE INVENTION

To provide assistance during a driving maneuver, a driver of a motor vehicle activates a driver assistance system in a first step 1. The driver assistance system is, for example, a parking assistance system which assists the driver in parking in a parallel parking space or in a perpendicular parking space. For assisting the driver in parking in a parking space, the parking assistance system takes over necessary steering adjustments for parking in the parking space. In one alternative specific embodiment, in addition to the necessary steering adjustments the parking assistance system also controls the longitudinal guidance of the vehicle. To allow the steering adjustments for parking the vehicle in the parking space to be taken over, it is necessary to initially find a suitable parking space. For this purpose, in a second step 3 the surroundings of the motor vehicle are scanned for potential parking spaces as the vehicle passes by. Based on the detected surroundings, the parking assistance system is able to ascertain whether a suitable parking space is present. A suitable parking space is present in particular when the distance between two objects delimiting the space is large enough to allow the vehicle to be parked.

As soon as a parking space has been detected, this is signaled to the driver. If the driver would like to park in the parking space, the driver stops and transfers the steering operation to the parking assistance system. The steering operation may be transferred to the parking assistance system by activating a switch, for example. Any other desired option for signaling to the parking assistance system that it is to take over the steering operation is also possible.

The transfer of the steering operation means that the parking assistance system takes over the steering of the vehicle. In one alternative specific embodiment, the parking assistance system also takes over the longitudinal guidance of the vehicle. The steering and optionally the longitudinal guidance of the vehicle are transferred in a third step 5.

To allow the vehicle to be steered into the parking space and to carry out the parking maneuver, a trajectory is initially computed. The vehicle is then moved along the trajectory.

During the automatic steering operation of the vehicle, a check is regularly made as to whether all systems are operating properly or whether a malfunction has occurred. This is carried out in a fourth step 7.

Examples of a malfunction that may occur are complications in the brake system or in the automatic steering system of the vehicle. This may involve, for example, the failure of components, or also problems in data transmission.

If no malfunctions are identified, the automatic steering operation is continued in a fifth step 9. If malfunctions occur, the driver of the motor vehicle is informed in a sixth step 11. At the same time, the automatic steering operation is terminated, and the driver receives information on the basis of which he is able to continue the driving maneuver.

The information received by the driver is, for example, displays of how the driver must steer in order to guide the vehicle along the computed trajectory. The driver is thus able to independently complete the driving maneuver that was planned by the parking assistance system. The driver receives further information concerning maneuvers to be carried out, so that it is not up to the driver alone to end the maneuver.

Thus, the driver continues to be assisted by the method according to the present invention, even if there are malfunctions or if a component fails.

To ensure that the driver takes over the longitudinal guidance, in particular when the automatic longitudinal guidance fails, it is advantageous in this case to also turn over the steering of the vehicle to the driver. As soon as the driver must independently steer the vehicle, he also automatically takes over the longitudinal guidance. In particular, as a result of the transfer of the steering from the system it is clearly indicated to the driver that problems have arisen, and that a driver assistance system is not able to independently carry out the driving maneuver as planned. Thus, upon transfer of the steering as well as the longitudinal guidance, the driver is reminded in particular that the vehicle is not automatically braking, and that the driver must take over the braking of the vehicle in order to avoid collisions, for example.

If the driver assistance system takes over only the steering, the longitudinal guidance is already under the control of the driver, so that if there is a malfunction of the automatic steering system, in addition to the longitudinal guidance the driver takes over the steering of the vehicle, and continues to receive information only concerning steering adjustments to be made.

The information concerning necessary steering adjustments may be provided by arrow representations, for example. In this case, the driver must turn the steering wheel, for example, in the direction of the arrow until the arrow lights up. Alternatively, it is possible to transmit the steering information by haptic means, for example, by applying a torque to the steering wheel. In this case, the driver is given the feeling of traveling over a bump in the lane. However, in particular if malfunctions of servomotors, for example, occur so that it is not possible to apply torque to the steering wheel, it is advantageous to visually display the necessary steering motions.

As the result of switching over from the automatic steering operation to driver assistance when there is a malfunction or failure of a component, in which the driver is informed of necessary steering adjustments, the driver continues to be ensured of assistance during the driving maneuver, even if there is a system error, a malfunction, or failure of a component. Thus, in this case as well, the driver is not left to fend for himself.

What is claimed is:

1. A method for assisting a driver of a motor vehicle during a driving maneuver, comprising:

detecting, by at least one sensor, surroundings of the motor vehicle;

computing, by at least one control unit, based on the detected surroundings, at least one suitable trajectory for carrying out the driving maneuver;

automatically steering the motor vehicle to carry out the driving maneuver to follow the at least one suitable trajectory; and determining, by the at least one control unit, a malfunction of the motor vehicle, and performing the following steps only if the malfunction occurs: (i) informing the driver of the malfunction; (ii) terminating the automatic steering operation; and (iii) displaying at least a remainder of the at least one suitable trajectory for manually completing the driving maneuver.

2. The method as recited in claim 1, wherein the automatic steering operation includes automatic longitudinal guidance of the motor vehicle.

3. The method as recited in claim 1, wherein the malfunction includes at least one of a malfunction of the steering system or a malfunction of the brake system of the motor vehicle.

4. The method as recited in claim 3, wherein the driver is informed of the termination of the automatic steering operation, by at least one of a visual, acoustic, and haptic indication.

5. The method as recited in claim 3, wherein the driving maneuver is a parking maneuver into one of a perpendicular parking space or a parallel parking space.

6. The method as recited in claim 3, wherein for detecting the surroundings of the motor vehicle, distances from objects in the surroundings of the motor vehicle to the motor vehicle are detected, and a surroundings map is created based on the detected distances from objects in the surroundings of the motor vehicle.

7. The method as recited in claim 6, wherein the surroundings map and the position of the motor vehicle are displayed to the driver.

8. The method as recited in claim 7, wherein the at least one trajectory for carrying out the driving maneuver is displayed in the surroundings map.

9. The method as recited in claim 8, wherein the position of the motor vehicle on the trajectory is displayed to the driver.

* * * * *